No. 756,318. PATENTED APR. 5, 1904.
E. J. BARTON.
MILK PAIL.
APPLICATION FILED FEB. 21, 1903.
NO MODEL.

Witnesses
Geo. G. Klinkutts
E. B. Clark

Inventor
Ed. J. Barton
By [signature]
Attorney

No. 756,318. Patented April 5, 1904.

UNITED STATES PATENT OFFICE.

EDWARD JOHN BARTON, OF WEWOKA, INDIAN TERRITORY.

MILK-PAIL.

SPECIFICATION forming part of Letters Patent No. 756,318, dated April 5, 1904.

Application filed February 21, 1903. Serial No. 144,409. (No model.)

*To all whom it may concern:*

Be it known that I, EDWARD JOHN BARTON, a citizen of the United States, residing at Wewoka, in the county of Seminole, Indian Territory, have invented new and useful Improvements in Milk-Pails, of which the following is a specification.

This invention relates to a milk-pail having strainers designed for use in milking.

The object of my invention is to provide a milk-pail of simple construction having means for straining the milk during the milking operation and effectively excluding straws and dirt, which with the ordinary pail are liable to be blown by the wind into the milk.

The construction and arrangement of parts constituting my invention will be set forth in the claim.

The details of construction of my improved pail are illustrated in the accompanying drawings, in which—

Figure 1:
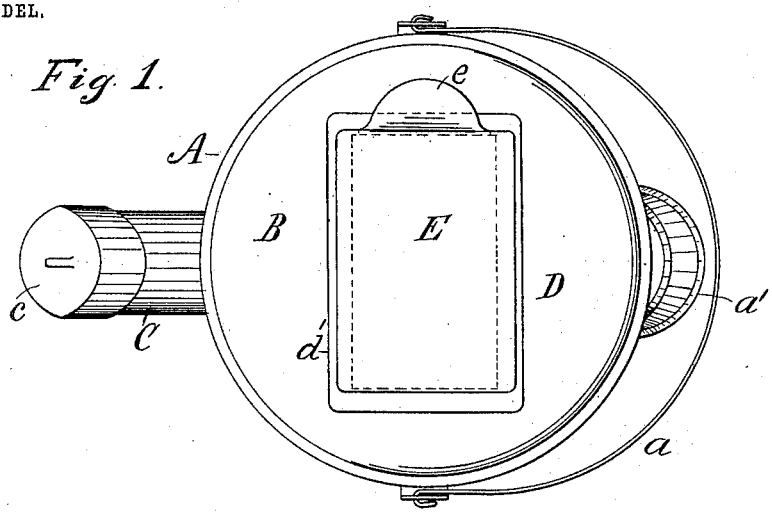
Figure 2:
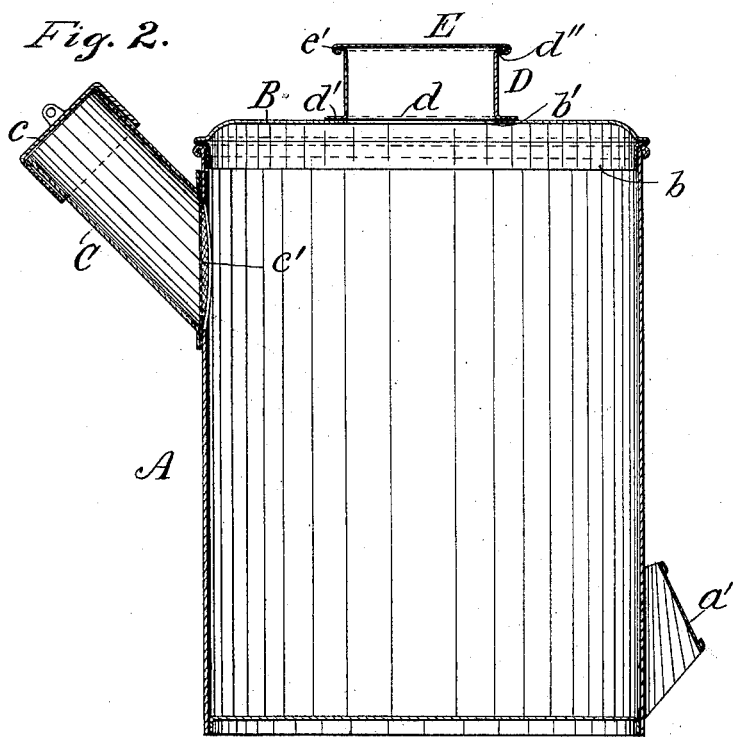

Figure 1 represents a top plan view of the pail. Fig. 2 represents a vertical section thereof.

The body A of the milk-pail is preferably made of tin, of cylindrical form, and is provided with a removable cover B, having the usual downwardly-extending flange $b$, which fits inside of the body portion of the pail. The body A is provided with the usual bail $a$, connecting with ears at the top, and with the lower handle $a'$ for tilting the pail in pouring out the milk. The cover B is provided with a central rectangular opening $b'$, over which is applied a strainer $d$, of wire-gauze or other suitable perforated straining material. This strainer is preferably soldered to the cover B around the edge of the opening $b'$. Around the opening is also soldered or otherwise secured the rectangular hopper D through the medium of its bottom flanges $d'$. The walls of the hopper D are preferably made perpendicular to the cover and provided at the top with the outwardly-turned flanges $d''$ for holding the sliding lid E. This lid is made with an end handle $e$ and with lateral turned-in flanges $e'$, making longitudinal grooves for receiving the flanges $d''$ of the hopper. With this construction it is evident that the lid E may be readily slid off from the hopper or slid onto the same for effectively excluding dust after the milking operation. Milk is drawn into the hopper D and passes through the strainer $d$ into the can, thereby being strained and freed from hairs, straw, and dust which may be blown by the wind into the hopper during the milking operation. In order to provide for a second straining of the milk without removing the cover B, I secure a short discharge-spout C in an inclined position to the side of the pail near the top and cover the inner opening thereof at the wall of the can with a wire-cloth strainer $c'$, which may be soldered in place. To the outer end of the spout is applied a closing-cap $c$ for preventing the entrance of dirt or flies or other insects. As the milk is poured out of the spout C it will be again strained and delivered in a pure condition.

The hopper D serves as a handle for the cover B and also to prevent the milk from spattering about as it is drawn onto the strainer $d$. The sliding lid E is useful and advantageous in excluding insects and dirt from the strainer and hopper. By making the cover B removable the hopper and strainer can be readily cleaned. The pail can also be better cleaned.

Having described my invention, what I claim, and desire to secure by Letters Patent, is—

The combination with the pail-body of a removable cover having secured thereto a rectangular hopper, with parallel side walls having outwardly-turned flanges $d$, a strainer at the bottom thereof, and a sliding lid at the top thereof, having flanges $e'$ embracing the flanges $d$, substantially as described.

In testimony whereof I affix my signature in presence of two witnesses.

EDWARD JOHN BARTON.

Witnesses:
M. F. MORWILER,
O. F. MCCONNELL.